United States Patent [19]
Barrett et al.

[11] Patent Number: 5,819,878
[45] Date of Patent: Oct. 13, 1998

[54] PRETENSIONING SYSTEM FOR SYNCHRONIZATION AND POSITIONING SYSTEM

[75] Inventors: Dale R. Barrett, Berlin; James A. Rivera, Bristol; Bruce P. Swaybill, Farmington, all of Conn.

[73] Assignee: Otis Elevator Company, Farmington, Conn.

[21] Appl. No.: 746,255

[22] Filed: Nov. 7, 1996

[51] Int. Cl.⁶ .................................................. E15F 15/20
[52] U.S. Cl. ................................ 187/324; 49/121; 49/123
[58] Field of Search .................................. 187/324, 334, 187/335; 49/121, 123, 116, 120; 198/814

[56] References Cited

U.S. PATENT DOCUMENTS

| | | | |
|---|---|---|---|
| 1,232,439 | 7/1917 | Spitzfaden | 49/123 |
| 1,966,182 | 7/1934 | McCormick | 049/121 |
| 5,297,782 | 3/1994 | Dombrowski et al. | |
| 5,347,755 | 9/1994 | Jaster et al. | 49/123 |
| 5,701,973 | 12/1997 | Tracey | 49/121 |

FOREIGN PATENT DOCUMENTS

| | | | |
|---|---|---|---|
| 2693781 | 1/1994 | France | |
| 4240437 | 7/1993 | Germany | 49/121 |

*Primary Examiner*—Karen M. Young
*Assistant Examiner*—Gregory A. Morse

[57] ABSTRACT

A pretensioning system for a relating cable synchronizing movement of elevator car doors includes a compression spring and a spacer disposed on one end of the relating cable. The compression spring is compressed to the length of the spacer disposed internally to the spring to calibrate tension in the relating cable so than a no-slip condition is ensured.

3 Claims, 2 Drawing Sheets

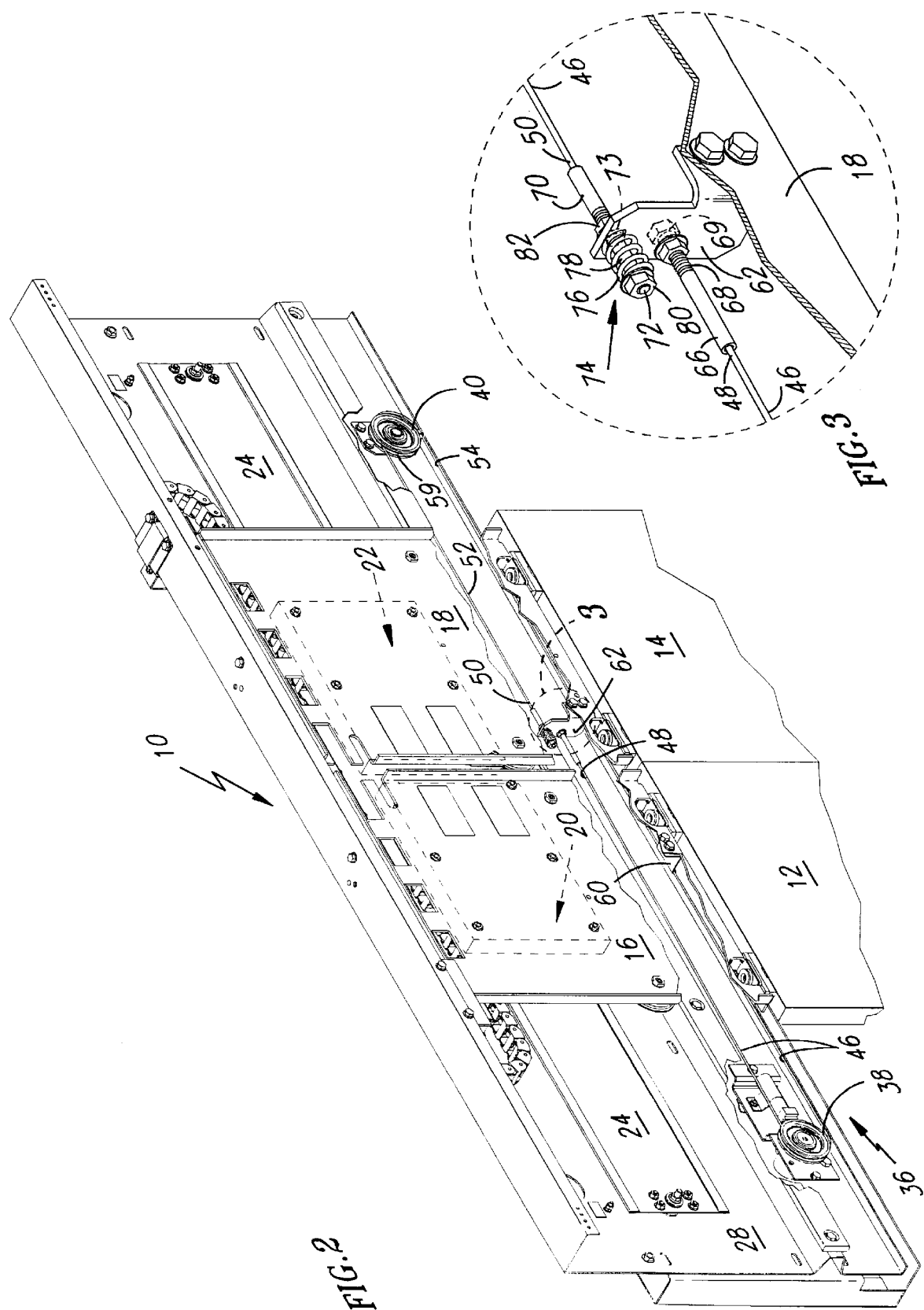

PRETENSIONING SYSTEM FOR SYNCHRONIZATION AND POSITIONING SYSTEM

CROSS-REFERENCE TO RELATED APPLICATIONS

This application is related to commonly owned co-pending applications filed on the same day herewith having Ser. Nos. 08/746,277 (OT-2661) and 08/746,281 (OT-2680).

TECHNICAL FIELD

The present invention relates to elevator systems and, more particularly, to movement and positioning of elevator car doors therefor.

BACKGROUND OF THE INVENTION

In conventional elevator systems, elevator car doors are opened and closed by door operators which are electromechanical devices that use a rotary electric motor, mechanical drive linkages, and a controller box. In a two door center opening bi-parting configuration, the electric motor drives one of the elevator car doors through the mechanical linkage that is attached onto that door. The other door is physically pulled by a relating cable extending over two pulleys with one end of the cable attaching onto one elevator car door and the other end attaching onto the second door.

The relating cable is usually secured to the elevator car doors by means of tie rods so that tension in the cable can be adjusted periodically. Typically, an elevator maintenance person performs a visual inspection of the door operation and of tension in the cable. If the maintenance person observes that the relating cable is either too tight or too loose, he/she readjusts the cable in accordance with his/her visual observations. Although such process of adjustment of the relating cable is time consuming, labor intensive, and leaves some margin for error, it has been adequate, because the relating cable was primarily used for physically pulling the second door to either open or closed positions. However, if the relating cable is to be utilized for other purposes, an improved technique for setting proper tension in the relating cable is desired. Furthermore, for some applications it is critical to maintain a predetermined tension in the relating cable throughout the operation of the elevator car door system to minimize slippage between the pulleys and the relating cable.

DISCLOSURE OF THE INVENTION

It is an object of the present invention to improve and simplify a technique for setting and maintaining proper tension in a relating cable of an elevator car door system.

It is another object of the present invention to minimize slippage between the relating cable and pulleys of the elevator car door system.

According to the present invention, a pretensioning system for a relating cable synchronizing movement of elevator car doors includes a compression spring and a spacer disposed on one end of the relating cable to establish a specific tension in the relating cable for minimizing slippage between the relating cable and door pulleys. The compression spring is placed on the end of the relating cable between a tension nut and a hitch. The spacer establishes spacing between the hitch and the tension nut so that when the spring is compressed to the length of the spacer, a predetermined tension in the relating cable is maintained.

The present invention allows the relating cable to be exactly tensioned and, therefore, minimizes slippage between the relating cable and pulleys.

One major advantage of the present invention is that it eliminates the need for a trial and error tensioning method and replaces visual tension setting with an exact method therefor.

Another advantage of the present invention is that it is cost efficient. First, the time spent by the maintenance person is significantly reduced during initial installation and during periodic adjustments. Second, the pretensioning system itself is not costly.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 2 is a cut-away, schematic, perspective view of the door system of FIG. 1 including a pretensioning device, according to the present invention; and FIG. 3 is an enlarged, schematic, perspective view of the pretensioning device of FIG. 2 circled in a broken line 3.

BEST MODE FOR CARRYING OUT THE INVENTION

Figure 1:
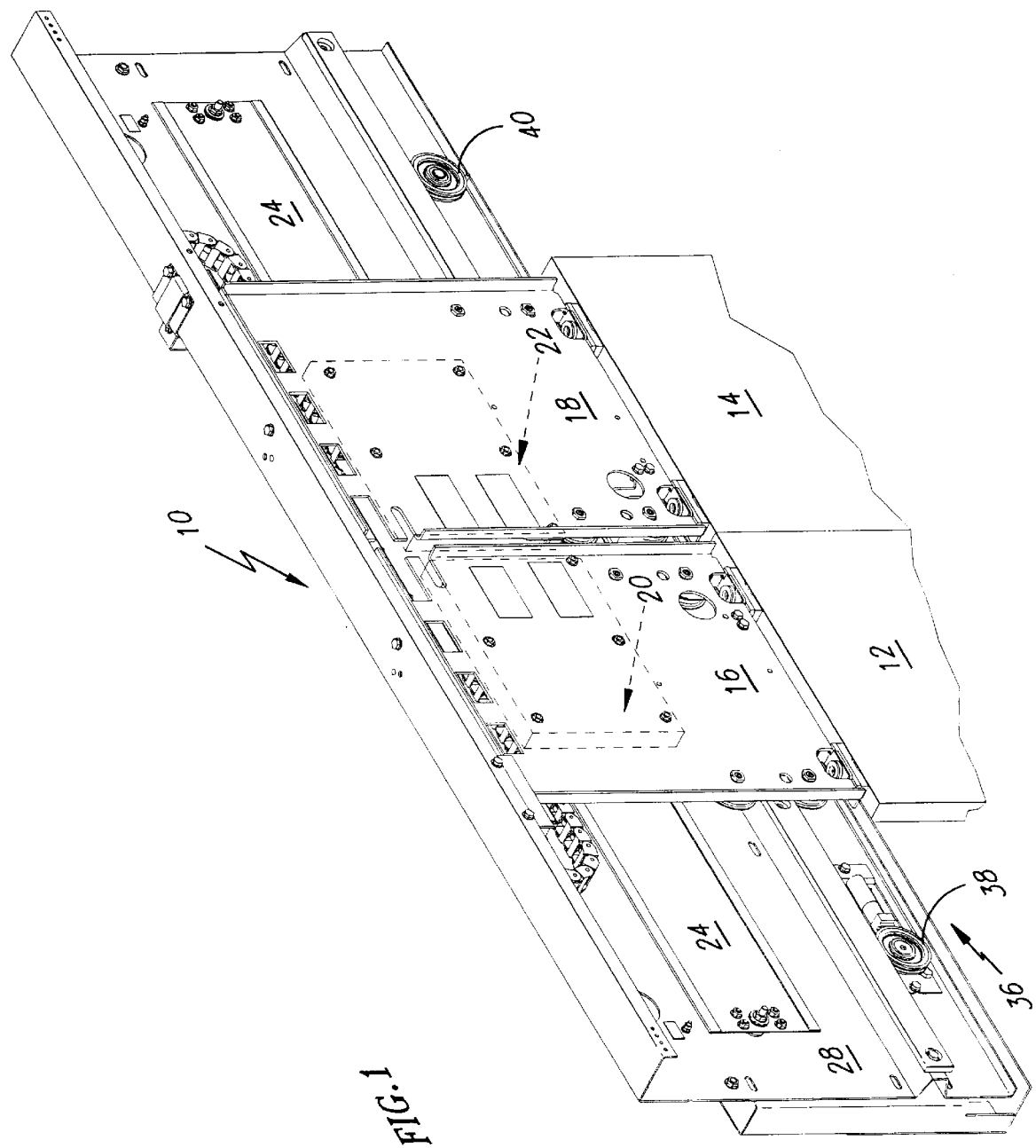
FIG. 1 is a schematic, perspective view of a door system.

Referring to FIG. 1, a door system 10 for opening and closing a first door 12 and a second door 14 includes a first door hanger 16 and a second door hanger 18 for suspending the first and second doors 12, 14 therefrom, respectively. The door system 10 also includes a first motor primary 20 and a second motor primary 22, each secured onto the first and second door hangers 16, 18, respectively, and a motor secondary 24 secured onto a header bracket 28 which is attached onto an elevator car (not shown).

Referring to FIG. 2, a synchronization system 36 includes a first pulley 38 and a second pulley 40, each attached to the header bracket 28 and disposed on opposite ends thereof. A relating cable 46 having a first end 48 and a second end 50 extends over the first and second pulleys 38, 40 to form a substantially continuous loop with an upper loop portion 52 and a lower loop portion 54. The pulleys 38, 40 are lined with high friction polymer liners 59. A first door hitch 60 fixedly attaches the lower loop portion 54 of the relating cable 46 onto the first door hanger 16. A second hitch 62 secures the first relating cable end 48 and the second relating cable end 50 onto the second elevator car door hanger 18.

Referring to FIG. 3, the first relating cable end 48 is fixedly secured within a first tie rod 66 that includes a threaded end 68 screwed into a first threaded opening 69 in the second door hitch 62 and secured therein by means of bolts. The second relating cable end 50 is fixedly secured within a second tie rod 70 having a threaded end 72. The second tie rod 70 protrudes through a second threaded opening 73 formed within the second door hitch 62. A pretensioning device 74 includes a compression spring 76 and a spacer 78 which are disposed between the tie rod end 72 and the second door hitch 62 and are secured thereon by means of a tension nut 80 and a lock nut 82.

In operation, the linear motor drives the elevator car doors 12, 14 into open and closed positions. Each motor primary 16, 18 moves each respective elevator car door 12, 14 in opposite directions. As the elevator car doors 12, 14 travel in opposite directions, the relating cable 46 pulls the doors 12, 14 to synchronize their movement. The simultaneous response of both doors is achieved when the synchronization system 36 and the pretensioning device 74 ensure a no slip condition. The synchronization system 36 includes the high friction polymer liner 59 to minimize the slippage between the pulleys 38, 40 and the cable 46. The pretensioning device ensures that the optimum tension for a no-slip condition in the cable is set initially and can be easily adjusted during regular maintenance.

To calibrate appropriate tension in the relating cable 46 during initial set up, the first end 48 of the relating cable 46 is secured within the first threaded opening 69 of the hitch 62 and adjusted to take up slack. Then the second end 50 of the relating cable 46 is inserted through the second threaded opening 73 of the hitch 62 to protrude therefrom with the pretensioning device 74 placed on the protruding second end 50 of the relating cable. The tension nut 80 is placed on the second end of the cable to maintain the pretensioning device thereon and is adjusted until the coil compression spring 76 is compressed to meet the length of the spacer 78. When the compression spring is compressed to the length of the spacer, the optimal tension for a no-slip condition is established. To secure the load on the spring, which equals the tension load on the cable, lock nut 82 is tightened to meet the hitch 62. During regular maintenance, the maintenance person has to ensure that the tension nut 80 has not become loose, and that the spring remains compressed to the length of the spacer.

The length of the spacer 78 is dictated by the spring constant of the coil compression spring 76 so that when the spring is compressed to the length of the spacer, the tension of the relating cable (which equals compression load of the spring) ensures a no slip condition. To ensure no slip condition and to minimize stretching of the relating cable during operation of the elevator car doors, a prestretched aircraft cable, having a three millimeter (3 mm) diameter, is used. An effective type of high friction polymer for fabricating pulley liners is urethane.

While the present invention has been illustrated and described with respect to a particular embodiment thereof, it should be appreciated by those of ordinary skill in the art, that various modifications to this invention may be made without departing from the spirit and scope of the present invention. For example, although the best mode embodiment depicts the pretensioning device operating on a door system driven by a linear motor, the present invention can be implemented on any type of a door operating system where slippage between cable and pulleys must be minimized. Also, the best mode embodiment depicts a two door center opening bi-parting configuration. The pretensioning system of the present invention is applicable to other door configurations, such as a single slide door, as well.

We claim:

1. A pretensioning system for a relating cable synchronizing movement of elevator car doors in an elevator system, said relating cable extending over a first pulley and second pulley and attaching to each of said elevator car doors by means of a first and a second hitch, said relating cable having a first cable end secured in a first threaded tie rod and a second cable end secured in a second threaded tie rod, said first threaded rod and said second threaded rod secured with said first hitch, said pretensioning system comprising:

a compression spring disposed about said first tie rod and secured between said first hitch and a tension nut; and a spacer disposed on said first tie rod between said first hitch and said tension nut to establish spacing between said first hitch and said tension nut so that when said spring is compressed to the length of said spacer a predetermined tension in said relating cable is maintained.

2. The pretensioning system according to claim 1, further comprising a lock nut adjacent to said first hitch, said lock nut adjusted to lock said pretensioning system in place.

3. A method for setting proper tension in a relating cable synchronizing movement of elevator car doors in an elevator system, said method comprising steps of:

securing a first tie rod attached onto a first end of said relating cable onto a hitch secured to a door hanger;

securing a second tie rod attached onto a second end of said relating cable onto said hitch;

adjusting said first tie rod of said relating cable to take up slack;

adjusting a tension nut disposed on said second tie rod of said relating cable until a compression spring is compressed to the length of a spacer placed between said tension nut and said hitch; and adjusting a lock nut adjacent to said hitch to secure said spring in place.

* * * * *